(12) United States Patent
Fink

(10) Patent No.: US 7,817,607 B1
(45) Date of Patent: Oct. 19, 2010

(54) PRIVATE MOBILE IP CONNECTION IN A SHARED-POOL ENVIRONMENT

(75) Inventor: Nathan Aaron Fink, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 835 days.

(21) Appl. No.: 11/427,389

(22) Filed: Jun. 29, 2006

(51) Int. Cl.
*H04W 4/00* (2009.01)

(52) U.S. Cl. .................. 370/338; 455/434; 455/410
(58) Field of Classification Search .......... 455/410, 455/411, 434, 435.1; 370/338, 310, 328
See application file for complete search history.

(56) References Cited

U.S. PATENT DOCUMENTS 7,296,291 B2 * 11/2007 Tahan ........................ 726/11
2004/0181602 A1 * 9/2004 Fink ........................... 709/229
2006/0223501 A1 * 10/2006 Van Moffaert et al. ...... 455/411
2007/0025246 A1 * 2/2007 Pirzada et al. .............. 370/230
2007/0230411 A1 * 10/2007 Batta .......................... 370/338

* cited by examiner

*Primary Examiner*—Joseph H Feild
*Assistant Examiner*—Huy D Nguyen

(57) ABSTRACT

Systems, methods, and computer-readable media for providing a private mobile IP connection in a shared-pool environment are provided. Embodiments include authenticating a mobile subscriber at a common router or home agent and establishing a communication protocol which is configured to link the authenticated subscriber to a private network such that only communications originating from the private network or passing through the private network are communicated to the subscriber. Utilizing embodiments hereof, mobile subscribers can access a private network through a common router or home agent knowing that stateless attacks will be blocked while still benefiting from the efficiencies of utilizing a shared-pool environment.

8 Claims, 3 Drawing Sheets

PRIVATE MOBILE IP CONNECTION IN A SHARED-POOL ENVIRONMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Using a shared Internet Protocol (IP) Pool is an efficient way to manage IP addresses in association with Mobile IP architecture. In an IP Pool, numerous mobile users may access a router serving as the home agent and connect to their specific private network(s), that is, one or more private networks for which the mobile user is an authorized user. The router or home agent services multiple private networks and is responsible for pairing subscribers only with those private networks for which s/he is an authorized user. Pairing mobile subscribers with a specific private network enables private wireless mobile transport such that traffic does not cross the Internet unencrypted.

While shared-pool environments offer numerous benefits to their subscribers, conventional methods of pairing mobile subscribers with the private networks for which they are authorized users at a common router or home agent do not provide a way to inhibit stateless attacks over the private network originating from another private network to which access is gained through the same router.

SUMMARY

This summary is provided to introduce a selection of concepts in a simplified form that are further described below in the Detailed Description. Embodiments of the present invention are defined by the claims below. This summary is intended to summarize embodiments of the invention and is not intended to limit the scope of the claims in any way.

In embodiments, a method for providing a private mobile Internet Protocol (IP) connection in a shared-pool environment is provided. The subscriber is authenticated at the router or home agent. Subsequently, a communication protocol is established which links the authenticated subscriber to a private network such that only communications originating from the private network or passing through the private network are communicated to the subscriber. That is, any communications originating or passing through a network other than the private network are blocked such they are not communicated to the subscriber.

In other embodiments, one or more computer-readable media having computer-useable instructions embodied thereon for performing a method for pairing a subscriber with a private network from which the subscriber may receive communications is provided. The method includes receiving a communication destined for the subscriber, determining whether the communication originated or was received through a private network associated with the subscriber and, if so, communicating the communication to the subscriber. If, however, it is determined that the communication originated or was received through a private network that is not associated with the subscriber, the communication is blocked and not communicated to the subscriber.

In still further embodiments, a system for pairing a mobile subscriber with a private network from which the subscriber is authorized to receive communications is provided. The system includes a plurality of private networks and a home agent in communication with each of the plurality of private networks. Each private network has a logical interface and at least one mobile subscriber associated therewith. The home agent includes an access control list that contains an association between each mobile subscriber that is associated with any of the plurality of private networks and at least one logical interface from which each mobile subscriber may receive communications.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
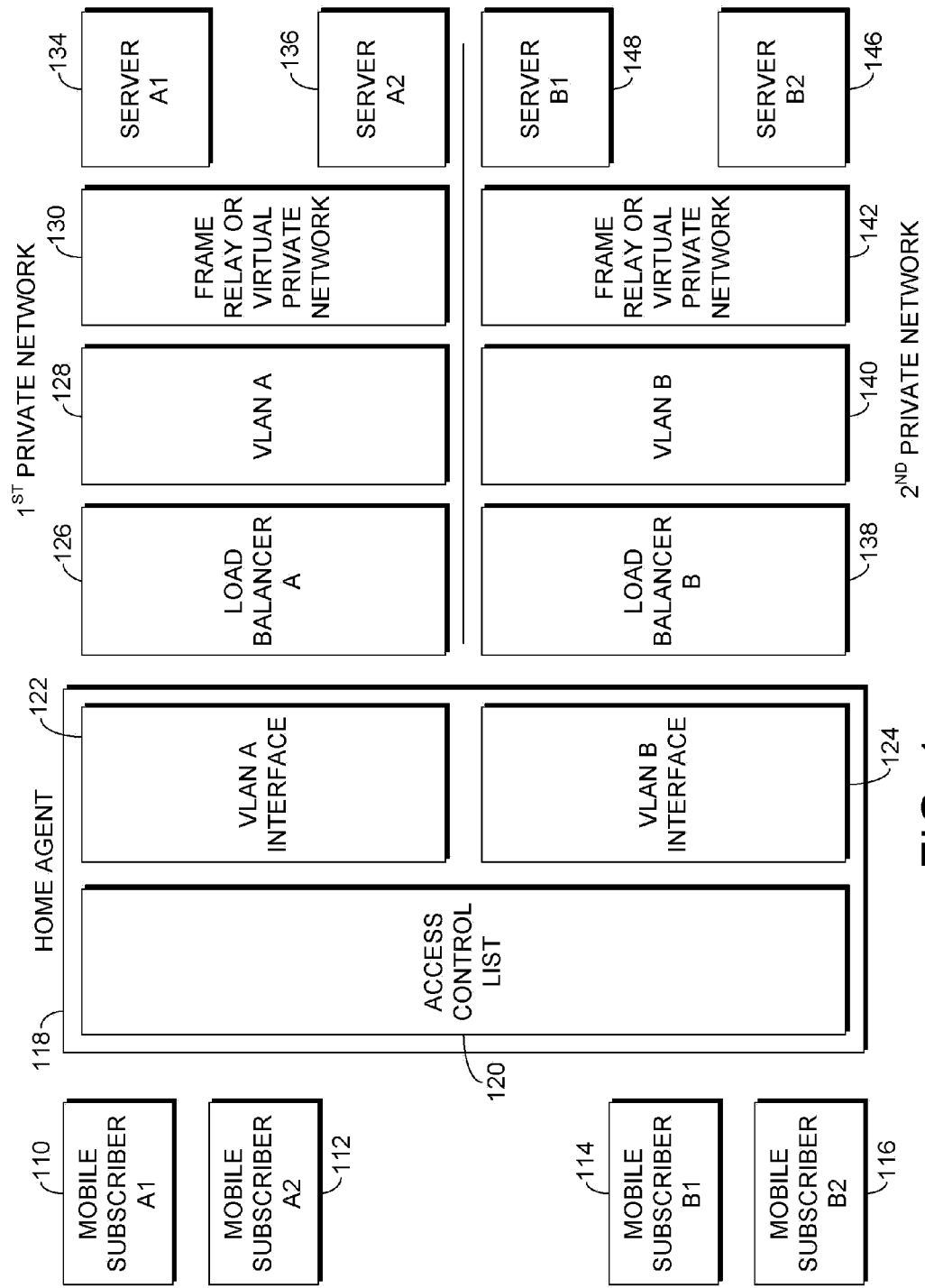
FIG. 1 is a block diagram illustrating an exemplary system architecture for practicing embodiments of the present invention in a shared-pool environment.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for providing a private mobile IP connection in a shared-pool environment. Utilizing embodiments hereof, mobile users can access a private network through a common router or home agent knowing that stateless attacks will be blocked while still benefiting from the efficiencies of utilizing a shared-pool environment.

Throughout the description of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. To the extent a definition is not provided in this specification, a definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things, a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

With reference to the drawing figures in general, and initially to FIG. 1 in particular, a block diagram is illustrated showing an exemplary system architecture 100 suitable for use in practicing embodiments of the present invention in a shared-pool environment. It will be understood and appreciated by those of ordinary skill in the art that the system architecture 100 shown in FIG. 1 is merely an example of one suitable architecture and is not intended to suggest any limitation as to the scope of use or functionality of the present invention. Neither should the system architecture 100 be interpreted as having any dependency or requirement related to any single component or combination of components illustrated therein.

System architecture 100 includes four mobile subscribers: mobile subscriber A1 110, mobile subscriber A2 112, mobile subscriber B1 114 and mobile subscriber B2 116. It will be understood by those skilled in the art that the mobile subscribers 110, 112, 114, and 116 illustrated in FIG. 1 are exemplary in nature and in number and should not be construed as limiting. Any number of mobile subscribers may have access to a common router, as more fully described below, and thereby take advantage of the desired functionality within the scope of embodiments of the present invention.

Each of mobile subscribers A1 and A2, 110 and 112, respectively, are mobile users of a first private network and each of mobile subscribers B1 and B2, 114 and 116, respectively, are mobile users of a second private network. It will be understood that the first and second private networks illustrated in FIG. 1 are exemplary in nature and in number and are not intended to limit the scope of embodiments of the present invention in any way. System architecture 100 further includes a home agent 118. The home agent 118 is a router which stores or has access to the permanent or dynamic IP address of each mobile subscriber that has been provided with the authority to access any private network that is a member of the shared IP pool; either the first or the second private network in the illustrated embodiment. The home agent 118 includes an access control list 120 and a VLAN or logical interface for each private network that is a member of the shared IP pool. In the illustrated embodiment, the home agent 118 includes two VLAN interfaces, VLAN Interface A 122 associated with the first private network and VLAN Interface B 124 associated with the second private network.

The access control list 120 contains the information needed to link mobile subscribers to the appropriate private network(s). That is, the access control list 120 contains an association between the permanent or dynamic IP address of each mobile subscriber that has been provided with the authority to access any private network that is a member of the shared IP pool and the private network(s) that each mobile subscriber has the authority to access. Additionally, the access control list 120 contains an association between the permanent or dynamic IP address of each mobile subscriber that has been provided with the authority to access any private network that is a member of the shared IP pool and the VLAN or logical interface(s) from which a communication destined for each mobile subscriber must have entered the home agent 118. In the illustrated embodiment, mobile subscribers A1 110 and A2 112 have the authority to access the first private network and communications destined for mobile subscribers A1 and A2 must originate through VLAN Interface A 122. Likewise, mobile subscribers B1 114 and B2 116 have the authority to access the second private network and communications destined for mobile subscribers B1 and B2 must originate through VLAN Interface B. Accordingly, the access control list 120 contains an association between the permanent or dynamic IP address of each of mobile subscribers A1 and A2, 110 and 112, respectively, and the first private network as well as an association between the permanent or dynamic IP address of each of mobile subscribers A1 and A2 and VLAN Interface A 122. The access control list 120 further contains an association between the permanent or dynamic IP address of each of mobile subscribers B1 and B2, 114 and 116, respectively, and the second private network as well as an association between the permanent or dynamic IP address of each of mobile subscribers B1 and B2 and VLAN Interface B 124.

System architecture 100 additionally includes a load balancer 126, a VLAN 128, a frame relay or Virtual Private Network (VPN) 130, and a plurality of servers 134, 136 associated with the first private network and a load balancer 138, a VLAN 140, a frame relay or Virtual Private Network (VPN) 142, and a plurality of servers 146, 148 associated with the second private network. It will be understood and appreciated by those of ordinary skill in the art that load balancers 126 and 138, VLANs 128 and 140, and frame relays (VPNs) 130 and 142 are exemplary in nature and that embodiments hereof may or may not include each of these components.

Additionally, it will be understood that servers 134, 136, 146, and 148 are exemplary in nature and in number and that any number of servers may be present in association with each of the first and second private networks. Further, the first and second private networks need not each include an equivalent number of servers associated therewith. Any and such variations, and any combinations thereof, are included within the scope of embodiments of the present invention.

In operation, if either mobile subscriber A1 110 or mobile subscriber A2 initiates a communication, the home agent 118 will be contacted. The home agent 118 will authenticate the mobile subscriber (as more fully described below) and reference the access control list 120 to determine the appropriate communication protocol to be established. The home agent 118 will then establish a communication protocol that allows the communication to be sent to the first private network through VLAN Interface A 122. VLAN Interface A 122 interfaces first with load balancer A 126 which balances traffic over the VLAN 128 associated with the first private network. After passing through VLAN A 128, any of the plurality of servers associated with the first private network, e.g., server A1 134 or server A2 136, can be reached via the frame relay network or virtual private network (VPN) 130 associated with the first private network.

Similarly, if either mobile subscriber B1 114 or mobile subscriber B2 initiates a communication, the home agent 118 will also be contacted, as each of the mobile subscribers 110, 112, 114 and 116 are attempting to establish communications with networks that are members of the same shared IP pool. The home agent 118 will authenticate the mobile subscriber (as more fully described below with reference to FIG. 2) and reference the access control list 120 to determine the appropriate communication protocol to be established. The home agent 118 will then establish a communication protocol that allows the communication to be sent to the second private network through VLAN Interface B 124. VLAN Interface B 122 interfaces first with load balancer B 138 which balances traffic over the VLAN 140 associated with the second private network. After passing through VLAN B 140, any of the plurality of servers associated with the second private network, e.g., server B1 148 or server B2 146, can be reached via the frame relay network or virtual private network (VPN) 142 associated with the second private network.

If a communication destined for either of mobile subscribers A1 110 or A2 112 is received by the home agent 118, the home agent 118 will reference the access control list 120 to determine if the communication entered through a VLAN or logical interface appropriately associated with the mobile subscriber 110 or 112. If the communication entered through VLAN Interface A 122, the communication will be sent to the mobile subscriber 110 or 112. If, however, the communication entered through a VLAN or logical interface other than VLAN Interface A 122, e.g., through VLAN Interface B 124, the home agent 118 will block the communication packet from reaching the mobile subscriber 110 or 112. Similar action will be undertaken by the home agent 118 to ensure that any communication that reaches either of mobile subscriber B1 114 or mobile subscriber B2 116 enters the home agent 118 through VLAN Interface B 124.

Figure 2:
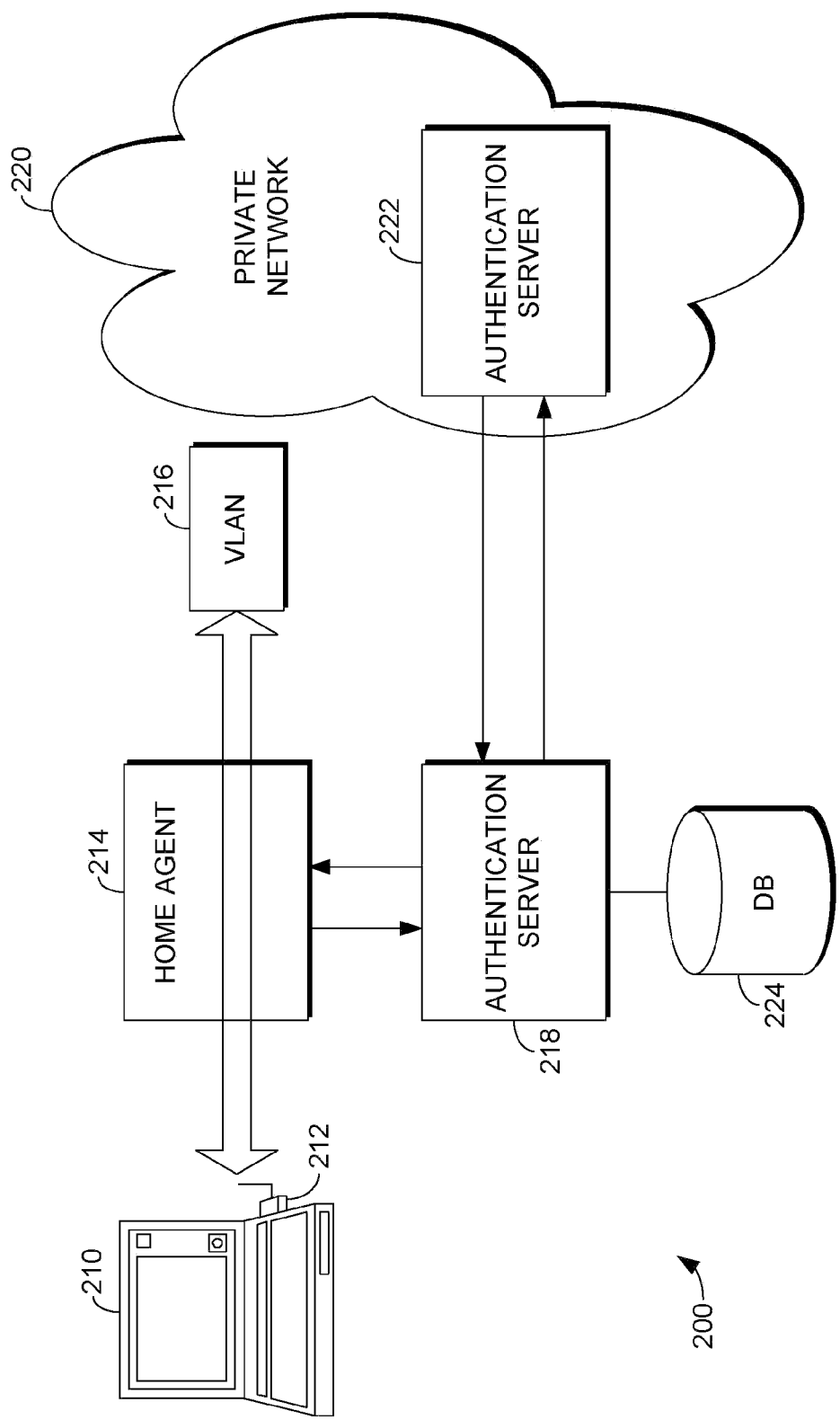
FIG. 2 is a schematic diagram of an exemplary mobile IP network suitable for use in practicing embodiments of the present invention.

Turning now to FIG. 2, a schematic diagram of an exemplary mobile IP system 200 suitable for practicing embodiments of the present invention, the system illustrating how mobile subscribers may be authenticated, is illustrated. The system 200 includes a mobile subscriber which, in the illustrated embodiment, is shown as a laptop computer 210 with a wireless modem 212. It will be understood, however, that the mobile subscriber additionally may be, by way of example only and not limitation, a user's personal computer, desktop computer, handheld device, consumer electronic device, and the like. It should be noted, however, that the invention is not limited to implementation on such computing devices, but may be implemented on any of a variety of different types of computing devices within the scope of embodiments of the present invention. The system 200 further includes a home agent 214 (e.g., similar to home agent 118 of FIG. 1), a VLAN (e.g., similar to VLAN A 128 and/or VLAN B 140 of FIG. 1), and an authentication server 230.

In operation, if the mobile subscriber 210 attempts to connect to a private network 220, e.g., either of the first or second private networks of FIG. 1, the home agent 214 is contacted to authenticate the wireless modem 212 associated with the mobile subscriber as eligible to access the network 220. The home agent 214 initially accesses its own authentication server 218. The home agent authentication server 218 may then contact an authentication server 222 associated with the private network 220 for which a connection is being attempted, the authentication server 222 containing authentication information specific thereto, or a database 224 associated with the home agent 214 that contains authentication information for all private networks associated with the home agent 214. Once the authentication server 218 receives the necessary permissions from either the database 224 or the private network authentication server 222, connection attributes are sent back to the home agent 214 to create the communication protocol needed to access the VLAN 216 and to open a communication channel to and from the private network 220 and the mobile subscriber 210. If the necessary permissions are not received by the authentication server 218, an error message may be displayed on a display device associated with the mobile subscriber 210 and the connection with the private network 220 will be denied.

Figure 3:
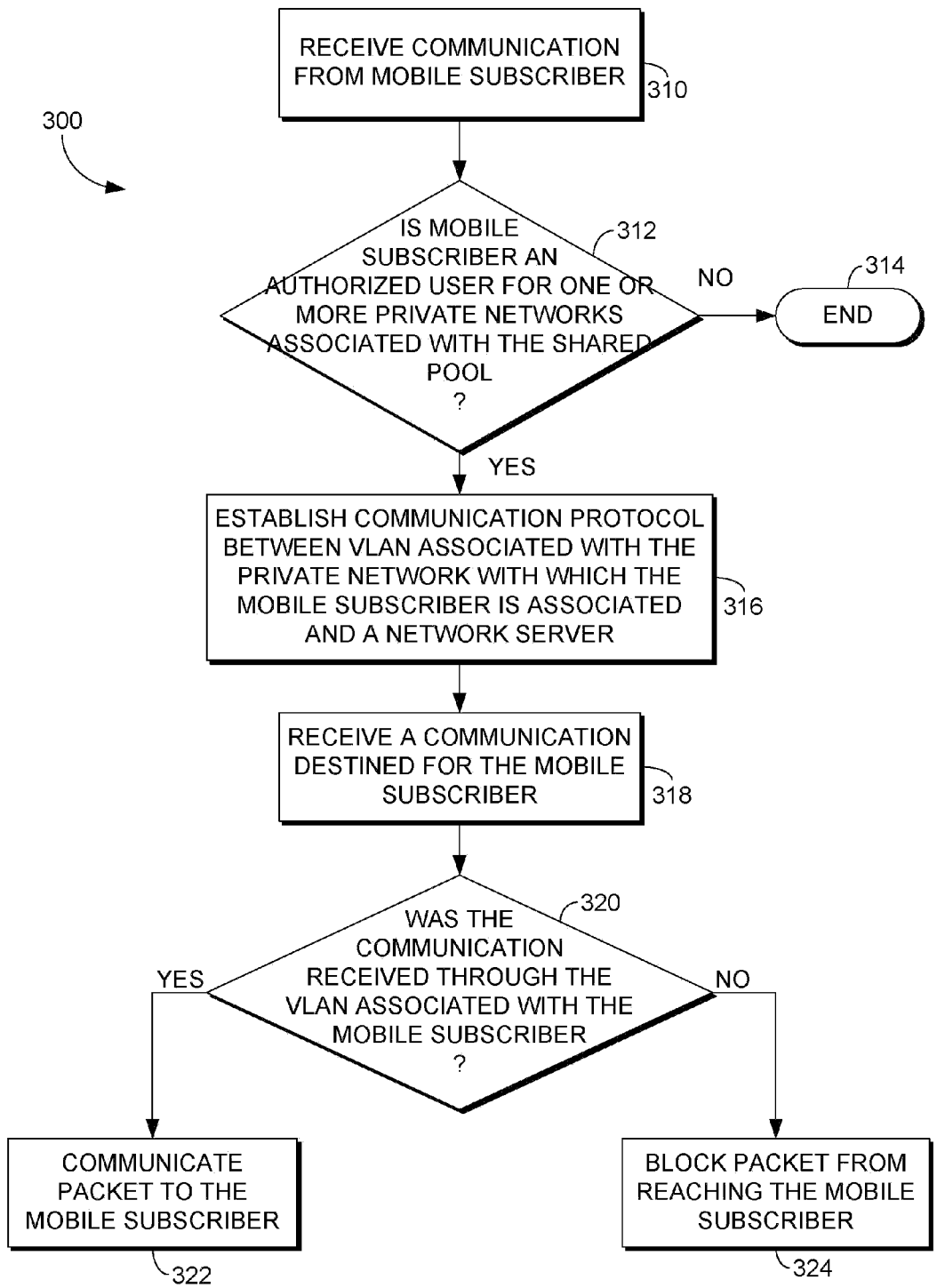
FIG. 3 is a flow diagram illustrating a method for providing a private mobile IP connection in a shared-pool environment in accordance with an embodiment of the present invention.

Turning now to FIG. 3, a flow diagram is shown illustrating a method 300 for providing a secure, private, mobile Internet Protocol connection in a shared-pool environment. Initially, as indicated at block 310, a communication is received from a mobile subscriber. Next, the communication is forwarded to the home agent and a determination is made whether or not the mobile subscriber is an authorized user for one or more of the private networks associated with the shared IP pool. This is indicated at block 312. If it is determined that the mobile subscriber is not an authorized user, the method terminates as indicated at block 314. In one embodiment, the mobile user may be presented with a message indicating that the communication will not be forwarded as desired. If, however, it is determined at block 312 that the mobile user is an authorized user for at least one of the private networks in the shared pool, a communication protocol is established between the VLAN or logical interface associated with the private network with which the mobile subscriber is associated and at least one network server in the private network. This is indicated at block 316.

Once a communication protocol is established, the mobile subscriber may receive communications originating or passing through the private network. As such, a communication destined for the mobile subscriber may be received, as indicated at block 318. As it is desired that the mobile subscriber receive communications only from the private network(s) with which s/he is associated and not from other private networks that are members of the shared-pool environment, it is next determined if the communication destined for the mobile subscriber was received through a VLAN or logical interface associated with the mobile subscriber. This is indicated at block 320. If it is determined that the communication was received through a VLAN or logical interface associated with the mobile subscriber, the packet is subsequently communicated to the mobile subscriber, as indicated at block 322. If, however, it is determined that the communication was received through a VLAN or logical interface that is not associated with the mobile subscriber, the packet is dropped and blocked from reaching the mobile subscriber. This is indicated at block 324.

Utilizing the systems and methods herein described, mobile subscribers are paired only with the private network(s) that they are authorized to access rather than all networks that are members of a shared Internet Protocol pool. As such, stateless attacks, that is, those communications originating from outside of the private network(s) a mobile subscriber is authorized to access, are blocked from reaching the mobile user.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method in a computerized environment for providing a private, mobile Internet Protocol connection in a shared-pool environment, the method comprising:
   authenticating a subscriber at a router,
   (a) wherein the router includes an access control list that matches an IP address of the subscriber to a first private network that the subscriber has authority to access, and
   (b) wherein the access control list also matches the IP address of the subscriber to a first VLAN from which communications, which are to be forwarded to the subscriber, enter the router;
   receiving from a server, which is associated with a second private network, a communication that is to be forwarded to the subscriber, wherein the communication is received through a second VLAN;
   responsive to receiving the communication from the server, referencing the access control list to determine that the second VLAN is not matched with the IP address of the subscriber; and
   based on the IP address of the subscriber not being matched with the second VLAN through which the communication from the server was received, preventing the communication from being forwarded to the subscriber.

2. The method of claim 1, wherein the router is a home agent.

3. The method of claim 1, wherein the subscriber is a mobile node.

4. The method of claim 1, wherein authenticating a subscriber at the router comprises:
   accessing an authentication server associated with the router; and
   receiving from the authentication server associated with the router connection attributes associated with the subscriber, wherein establishing the communication protocol comprises establishing the communication protocol using the connection attributes.

5. The method of claim 4, wherein the connection attributes include an identity of at least one private network the subscriber is authorized to access and an Internet Protocol address associated with the subscriber.

6. The method of claim 4, further comprising accessing one or more of the connection attributes communicated to the authentication server associated with the router from an authentication server associated with a private network the subscriber has attempted to access.

7. One or more non-transitory computer-storage media having computer-useable instructions embodied thereon for performing a method for pairing a subscriber with at least one private network from which the subscriber may receive a communication, the method comprising: authenticating the subscriber at a router,
   wherein the router includes an access control list that matches an IP address of the subscriber to a first private network that the subscriber has authority to access, and
   wherein the access control list matches the IP address of the subscriber to a first VLAN from which communications, which are to be forwarded to the subscriber, enter the router;
   receiving from a server a communication that is to be forwarded to the subscriber, wherein the communication is received by a home agent through a second VLAN;
   responsive to receiving the communication from the server, determining that the second VLAN is not associated on the access control list with the subscriber; and
   as a result of the subscriber not being associated with the second VLAN through which the communication from the server was received, preventing the communication from being forwarded to the subscriber.

8. A system for pairing a mobile subscriber with one or more private networks from which the mobile subscriber is authorized to receive communications, the system comprising:
   a first private network having associated therewith a first mobile subscriber, a first logical interface, and a first server that submits communications to be forwarded;
   a second private network having associated therewith a second mobile subscriber, a second logical interface, and a second server that submits communications to forwarded; and
   a home agent in communication with both the first private network and the second private network, the home agent including an access control list that indexes an association between the first mobile subscriber and a first VLAN the first private network and between the second mobile subscriber and a second VLAN the second private network, wherein the home agent authenticates the first subscriber by matching in the access control list an IP address of the first subscriber to the first private network,
   wherein the home agent receives from a server a communication that is to be forwarded to the first subscriber, wherein the communication is received through the second VLAN;

wherein, responsive to receiving the communication from the server, the home agent determines that the second VLAN is not associated in the access control list with the first subscriber; and wherein, as a result of the first subscriber not being associated with the second VLAN through which the communication from the server was received, preventing the communication from being forwarded to the first subscriber.

* * * * *